(12) United States Patent
Peterson (10) Patent No.: US 11,881,064 B2
(45) Date of Patent: Jan. 23, 2024

(54) TECHNOLOGIES FOR DETERMINING DRIVER EFFICIENCY

(71) Applicant: CalAmp Corp., Irvine, CA (US)

(72) Inventor: Stephen E. Peterson, Dana Point, CA (US)

(73) Assignee: CalAmp Corp, Irvine, CA (US)

(*) Notice: Subject to any disclaimer, the term of this patent is extended or adjusted under 35 U.S.C. 154(b) by 0 days.

(21) Appl. No.: 17/690,483

(22) Filed: Mar. 9, 2022

(65) Prior Publication Data

US 2023/0290194 A1   Sep. 14, 2023

(51) Int. Cl.
G09B 19/16 (2006.01)
G07C 5/08 (2006.01)
G07C 5/00 (2006.01)

(52) U.S. Cl.
CPC .......... *G07C 5/0816* (2013.01); *G07C 5/008* (2013.01)

(58) Field of Classification Search
CPC ............................. G07C 5/0816; G07C 5/008
See application file for complete search history.

(56) References Cited

U.S. PATENT DOCUMENTS

| 5,818,356 | A  | 10/1998 | Schuessler |
| 6,470,240 | B1 | 10/2002 | Haynes et al. |
| 9,153,084 | B2 | 10/2015 | Ricci |
| 9,162,690 | B2 | 10/2015 | Kumar et al. |
| 9,731,417 | B2 | 8/2017  | Bruemmer et al. |
| 9,815,368 | B2 | 11/2017 | Verheijen et al. |
| 9,950,722 | B2 | 4/2018  | Kumar et al. |
| 10,407,078 | B2 | 9/2019 | Ratnasingam |
| 10,430,745 | B2 | 10/2019 | Rani et al. |
| 10,503,176 | B2 | 12/2019 | Lesher et al. |
| 10,889,198 | B2 | 1/2021 | Koebler et al. |
| 11,227,234 | B2 | 1/2022 | Zamanzad Gavidel et al. |
| 2007/0027593 | A1* | 2/2007 | Shah ..................... B60W 50/00 702/33 |
| 2007/0282638 | A1 | 12/2007 | Surovy |
| 2016/0082905 | A1* | 3/2016 | Hsu ........................ G07C 5/0808 701/123 |
| 2016/0253924 | A1* | 9/2016 | Kwak ...................... G07C 5/02 701/123 |
| 2020/0191588 | A1* | 6/2020 | Park ................. G08G 1/096775 |
| 2020/0216001 | A1 | 7/2020 | Chauncey et al. |

FOREIGN PATENT DOCUMENTS

| CN | 102402808 | * | 9/2011 | ............. G08G 1/205 |
| EP | 2477011 | * | 9/2009 | ........... G07C 5/0825 |
| KR | 102335642 | * | 4/2017 | ............ B60W 50/14 |

* cited by examiner

*Primary Examiner* — Hongmin Fan
(74) *Attorney, Agent, or Firm* — Barnes & Thornburg LLP (57) ABSTRACT

Technologies for determining driver efficiency include receiving, by a telematics server, accelerometer data from a telematics device located in a vehicle driven by a driver. The accelerometer data defines a pattern of acceleration of the vehicle over a time period. The telematics server determines a driver efficiency score of the driver based on the accelerometer data. The driver efficiency score is indicative of an average absolute acceleration of the vehicle over the time period. The determined driver efficiency score may be compared to a reference efficiency score and/or efficiency scores of other drivers to rank the drivers.

20 Claims, 8 Drawing Sheets

TECHNOLOGIES FOR DETERMINING DRIVER EFFICIENCY

BACKGROUND

Telematics involves the integrated use of telecommunications and informatics, particularly for application in vehicles. Telematics functionality may include, but is not limited to, recording vehicle information, emergency warning systems, navigation functionality, safety warnings, and automated driving assistance. Vehicle telematics devices may process and transmit telematics data and other messages generated by a vehicle and connected devices. For example, the telematics data may be produced by sensors, controllers, and/or other peripheral devices located on the vehicle and/or within the telematics device itself.

Vehicle telematics are often used in the management of vehicle fleets. One consideration in the fleet management is fuel efficiency, which typically accounts for the largest cost in the operation of the fleet. Driver behavior and/or route characteristics can have a significant impact on the fuel efficiency of a vehicle. For example, with most vehicles, rapid acceleration or deceleration can significantly lower the fuel efficiency of the vehicle.

SUMMARY

According to an aspect of the present disclosure, a telematics server for determining driver efficiency includes a device interface and a driver efficiency analyzer. The device interface may be configured to receive accelerometer data from a telematics device located in a vehicle driven by a driver. The accelerometer data may define a pattern of acceleration of the vehicle over a time period. The driver efficiency analyzer may be configured to determine a driver efficiency score of the driver based on the accelerometer data, compare the driver efficiency score to a reference efficiency score, and generate a notification in response to a determination that the driver efficiency score satisfies a relationship to a reference efficiency score. The driver efficiency score may be indicative of an average absolute acceleration of the vehicle over the time period, and the device interface may be further configured to transmit the notification.

In some embodiments, to determine the driver efficiency score may include to determine absolute accelerometer data based on the accelerometer data, determine a total acceleration value for the time period based on the absolute accelerometer data, and determine an average absolute acceleration by dividing the total acceleration value by a temporal length of the time period. Additionally, to determine the average absolute acceleration of the vehicle over the time period may include to ignore periods of the accelerometer data having no acceleration.

In some embodiments, to transmit the notification may include to transmit the notification to the telematics device, wherein the notification instructs the telematics device to generate an alert. Additionally, in some embodiments, the driver efficiency analyzer may be further configured to determine a driver rank for the driver based on the driver efficiency score determined for the driver and driver efficiency scores determined for other drivers. Additionally or alternatively, the device interface may be further configured to receive route information defining a route taken by the vehicle during the generation of the accelerometer data. In such embodiments, to determine the driver efficiency score comprises to determine a driver efficiency score of the driver for the route.

Additionally, in some embodiments, the driver efficiency analyzer may be further configured to determine a reward for the driver based on the driver efficiency score determined for the driver. The driver efficiency analyzer may also be further configured to assign the driver to another vehicle based on the driver efficiency score determined for the driver. Further, in some embodiments, the device interface may be further configured to receive route information defining a route taken by the vehicle during the generation of the accelerometer data. In such embodiments, the driver efficiency analyzer may be further configured to determine an average driver efficiency score for the route based on the driver efficiency score determined for the driver and driver efficiency scores determined for other drivers for the route. Additionally, in such embodiments, the driver efficiency analyzer may be further configured to assign the driver to a first route based on the driver efficiency score determined for the driver and the average driver efficiency score of the first route.

According to another aspect of the present disclosure, a method for determining driver efficiency may include receiving, by a telematics server, accelerometer data from a telematics device located in a vehicle driven by a driver; determining, by the telematics server, a driver efficiency score of the driver based on the accelerometer data; comparing the driver efficiency score to a reference efficiency score; generating a notification in response to a determination that the driver efficiency score satisfies a relationship to a reference efficiency score; and transmitting the notification. The accelerometer data may define a pattern of acceleration of the vehicle over a time period, and the driver efficiency score may be indicative of an average absolute acceleration of the vehicle over the time period.

In some embodiments, determining the driver efficiency score may include determining absolute accelerometer data based on the accelerometer data, determining a total acceleration value for the time period based on the absolute accelerometer data, and determining an average absolute acceleration by dividing the total acceleration value by a temporal length of the time period. Additionally, in some embodiments, the method may include determining, by the telematics server, a driver rank for the driver based on the driver efficiency score determined for the driver and driver efficiency scores determined for other drivers.

In some embodiments, the method may also include receiving, by the telematics server, route information defining a route taken by the vehicle during the generation of the accelerometer data. In such embodiments, determining the driver efficiency score may include determining a driver efficiency score of the driver for the route. The method may additionally include assigning, by the telematics server, the driver to another vehicle based on the driver efficiency score determined for the driver.

Additionally, in some embodiments, the method may include receiving, by the telematics server, route information defining a route taken by the vehicle during the generation of the accelerometer data and determining, by the telematics server, an average driver efficiency score for the route based on the driver efficiency score determined for the driver and driver efficiency scores determined for other drivers for the route. In some embodiments, the method may also include assigning, by the telematics server, the driver to a first route based on the driver efficiency score determined for the driver and the average driver efficiency score of the first route.

According to a further aspect, one or more non-transitory, computer-readable storage media may include a plurality of instructions that, in response to execution, cause a telematics server to receive accelerometer data from a telematics device located in a vehicle driven by a driver; determine a driver efficiency score of the driver based on the accelerometer data; compare the driver efficiency score to a reference efficiency score; generate a notification in response to a determination that the driver efficiency score satisfies a relationship to a reference efficiency score; and transmit the notification. The accelerometer data may define a pattern of acceleration of the vehicle over a time period, and the driver efficiency score may be indicative of an average absolute acceleration of the vehicle over the time period.

In some embodiments, the plurality of instructions, in response to execution, may further cause the telematics server to determine a driver rank for the driver based on the driver efficiency score determined for the driver and driver efficiency scores determined for other drivers. Additionally, in some embodiments, the plurality of instructions, in response to execution, may further cause the telematics server to receive route information defining a route taken by the vehicle during the generation of the accelerometer data. In such embodiments, to determine the driver efficiency score may include to determine a driver efficiency score of the driver for the route.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); or (A, B, and C). Similarly, items listed in the form of "at least one of A, B, or C" can mean (A); (B); (C): (A and B); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
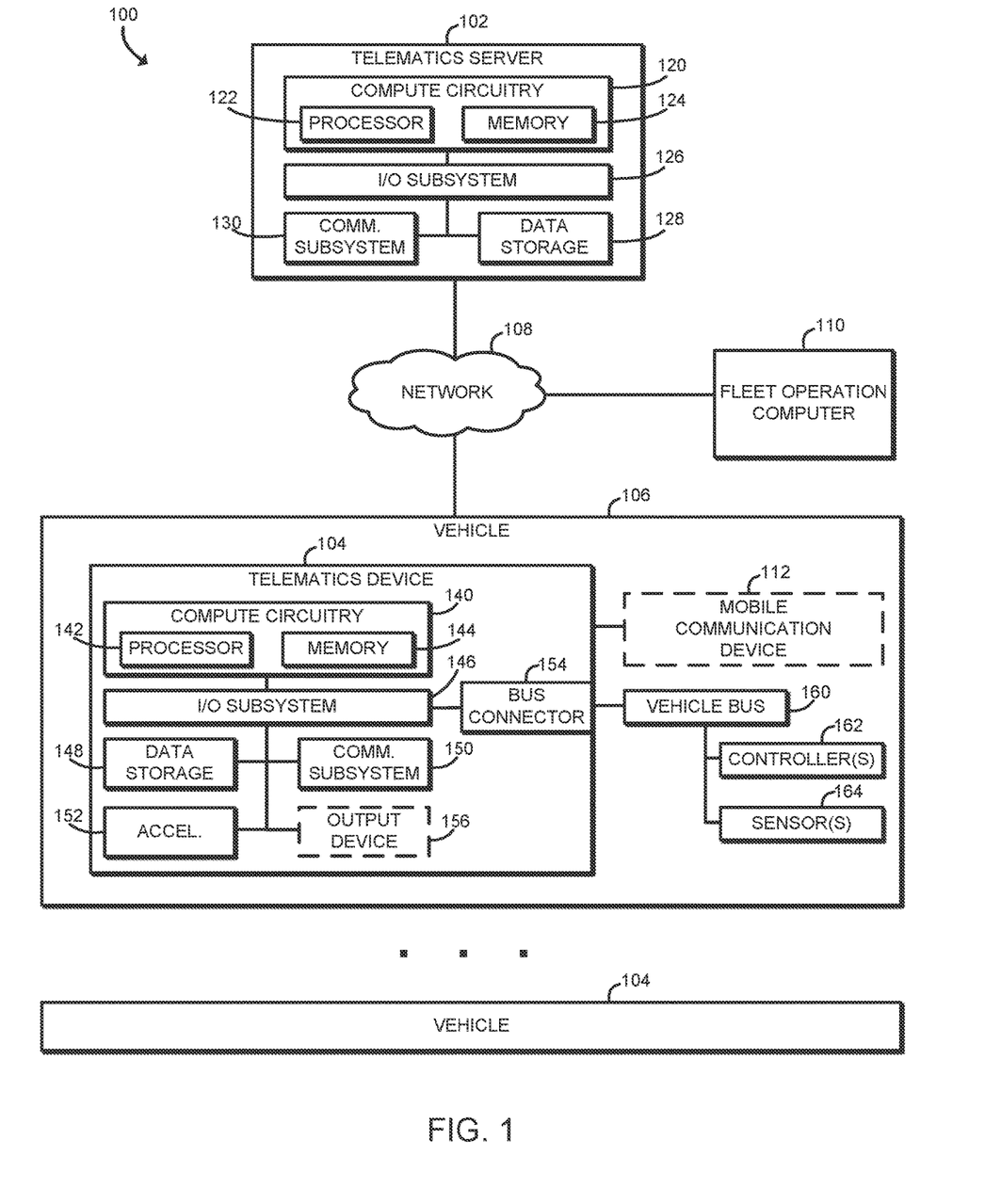
FIG. 1 is a simplified block diagram of at least one embodiment of a telematics system for determining driver efficiency.

Referring now to FIG. 1, an illustrative telematics system 100 for determining driver efficiency includes a telematics server 102 and a telematics device 104 installed in a vehicle 106 and in communication with the telematics server 102 over a network 108. In use, as described in more detail below, the telematics server 102 receives accelerometer data from the telematics device 104 via the network 108, analyzes the accelerometer data to determine a driver efficiency score indicative of an average absolute acceleration of the vehicle over an associated time period, and compares the driver efficiency score to a reference efficiency score. If the determined driver efficiency score satisfies a predetermined relationship to a reference efficiency score, the telematics server 102 generates a notification, which may be transmitted to the telematics device 104 or other devices of the telematics system 100. For example, if the determined driver efficiency score is greater than a reference threshold (i.e., has an increased amount of acceleration/deceleration relative to the reference threshold), the telematics server 102 may transmit the notification to the telematics device 104 to inform the driver of the vehicle 106. It should be appreciated that rapid acceleration/deceleration lowers the fuel efficiency of the vehicle. As such, the telematics device 104 monitors the acceleration (i.e., positive and negative acceleration) of the vehicle 106 to determine whether the driver is driving in a manner that increases the fuel efficiency of the vehicle.

The telematics server 102 may also rank the driver, relative to other drivers, based on the determine driver efficiency score and, in some embodiments, reward the driver based on the driver's efficiency score. Additionally, in some embodiments, the driver efficiency score may be associated with a particular route. Further, in some embodiments, the determined driver efficiency score may be used with driver efficiency scores of other drivers to determine an average driver efficiency score for a particular route. As discussed in more detail below, the determined driver efficiency score may be used to manage a fleet of vehicles by assigning the driver to a particular route and/or vehicle based on the associated driver efficiency score.

The telematics server 102 may be embodied as any type of computation or computer device capable of performing the functions described herein, including, without limitation, a server, a rack-mounted server, a blade server, a workstation, a network appliance, a web appliance, a desktop computer, a laptop computer, a tablet computer, a smartphone, a consumer electronic device, a distributed computing system, and/or a multiprocessor system. Additionally, in some embodiments, the telematics server 102 may be embodied as a "virtual server" formed from multiple computing devices distributed across the network 108 and operating in a public or private cloud. Accordingly, although the telematics server 102 is illustrated in FIG. 1 as embodied as a single computing device, it should be appreciated that the telematics server 102 may be embodied as multiple devices cooperating together to facilitate the functionality described below.

As shown in FIG. 1, the illustrative telematics server 102 includes compute circuitry 120, an I/O subsystem 126, a data storage device 128, and a communication subsystem 130. Of course, the telematics server 102 may include other or additional components, such as those commonly found in a typical server or other computer (e.g., various input/output devices), in other embodiments. Additionally, in some embodiments, one or more of the illustrative components may be incorporated in, or otherwise form a portion of, another component.

The compute circuitry 120 may be embodied as any type of device or collection of devices capable of performing various compute functions. In some embodiments, the compute circuitry 120 may be embodied as a single device such as an integrated circuit, an embedded system, a field-programmable-array (FPGA), a system-on-a-chip (SOC), or other integrated system or device. Additionally, in some embodiments, the compute circuitry 120 includes or is embodied as a processor 122 and memory 124. The processor 122 may be embodied as any type of processor capable of performing the functions described herein. For example, the processor 122 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the telematics server 102 such as operating systems, applications, programs, libraries, and drivers.

The compute circuitry 120 is communicatively coupled to other components of the telematics server 102 via the I/O subsystem 126, which may be embodied as circuitry and/or components to facilitate input/output operations with compute circuitry 120 (e.g., with the processor 122 and/or memory 124) and other components of the telematics server 102. For example, the I/O subsystem 126 may be embodied as, or otherwise include, memory controller hubs, input/output control hubs, firmware devices, communication links (i.e., point-to-point links, bus links, wires, cables, light guides, printed circuit board traces, etc.), and/or other components and subsystems to facilitate the input/output operations. In some embodiments, the I/O subsystem 126 may be incorporated, along with the processor 122, the memory 124, and other components of the telematics server 102, into the compute circuitry 120.

The data storage device 128 may be embodied as any type of device or devices configured for short-term or long-term storage of data such as, for example, memory devices and circuits, memory cards, hard disk drives, solid-state drives, or other data storage devices. The communication subsystem 130 of the telematics server 102 may be embodied as any communication circuit, device, or collection thereof, capable of enabling communications between the telematics server 102, the telematics device 104, and/or other remote devices. The communication subsystem 130 may be configured to use any one or more communication technology (e.g., wireless or wired communications) and associated protocols (e.g., Ethernet, Bluetooth®, Bluetooth Low Energy (BLE), Wi-Fi®, WiMAX, 3G LTE, 5G, etc.) to effect such communication.

The telematics system 100 may include multiple vehicles 106 (e.g., a fleet of vehicle 106), each of which may include an associated telematics device 104. Each telematics device 104 may be embodied as any type of device capable of performing the functions described herein. For example, the telematics device 104 may be embodied as, without limitation, a mobile computing device, an embedded device, a computer, a laptop computer, a notebook computer, a tablet computer, a wearable computing device, a multiprocessor system, a network appliance, a distributed computing system, a processor-based system, and/or a consumer electronic device. In the illustrative embodiment, each telematics device 104 is a special-purpose computing device configured to collecting and transmitting telematics data, which defines one or more characteristics of the vehicle such as the acceleration profile of the vehicle over a period of time.

As shown in FIG. 1, the illustrative telematics device 104 includes compute circuitry 140, an I/O subsystem 146, a data storage device 148, a communication subsystem 150, an accelerometer sensor 152, a bus connector 154, and, in some embodiments, one or more output devices 156. Of course, the telematics device 104 may include other or additional components, such as those commonly found in a portable or embedded computer (e.g., various input/output devices), in other embodiments. Additionally, in some embodiments, one or more of the illustrative components may be incorporated in, or otherwise form a portion of, another component.

The compute circuitry 140 may be embodied as any type of device or collection of devices capable of performing various compute functions. In some embodiments, the compute circuitry 140 may be embodied as a single device such as an integrated circuit, an embedded system, a field-programmable-array (FPGA), a system-on-a-chip (SOC), or other integrated system or device. Additionally, in some embodiments, the compute circuitry 140 includes or is embodied as a processor 142 and memory 144. The processor 142 may be embodied as any type of processor capable of performing the functions described herein. For example, the processor 142 may be embodied as a single or multi-core processor(s), digital signal processor, microcontroller, or other processor or processing/controlling circuit. Similarly, the memory 144 may be embodied as any type of volatile or non-volatile memory or data storage capable of performing the functions described herein. In operation, the memory 144 may store various data and software used during operation of the telematics device 104 such as operating systems, applications, programs, libraries, and drivers.

The compute circuitry 140 is communicatively coupled to other components of the telematics device 104 via the I/O subsystem 146, which may be embodied as circuitry and/or components to facilitate input/output operations with compute circuitry 140 (e.g., with the processor 142 and/or memory 144) and other components of the telematics device 104. For example, the I/O subsystem 146 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 146 may be incorporated, along with the processor 142, the memory 144, and other components of the telematics device 104, into the compute circuitry 140.

The data storage device 148 may be embodied as any type of device or devices configured for short-term or long-term storage of data such as, for example, memory devices and circuits, memory cards, hard disk drives, solid-state drives, or other data storage devices. The communication subsystem 150 of the telematics device 104 may be embodied as any communication circuit, device, or collection thereof, capable of enabling communications between the telematics device 104, the telematics server 102, and/or other remote devices. The communication subsystem 150 may be configured to use any one or more communication technology (e.g., wireless or wired communications) and associated protocols (e.g., Ethernet, Bluetooth®, Bluetooth Low Energy (BLE), Wi-Fi®, WiMAX, 3G LTE, 5G, etc.) to effect such communication.

The accelerometer device 152 may be embodied as any type of accelerometer device capable of producing accelerometer data indicative of an acceleration of the vehicle 106. It should be appreciated that the "acceleration" of the vehicle 106 may include both positive acceleration and negative acceleration (i.e., deceleration) of the vehicle 106, which is referred to herein in combination as "acceleration." The accelerometer device 152 may include one or more accelerometers of any suitable type such as a piezoelectric accelerometer, a piezoresistance accelerometer, or a capacitive accelerometer.

The output device(s) 156 may be embodied as any type of output device capable of presenting an output or information to a driver of the vehicle 106. For example, the output device 156 may be embodied as, or otherwise include, a visual output device such as a display screen, an audible output device such as a speaker or buzzer, and/or a tactile output device such as a vibration transducer.

The bus connector 154 may be embodied as any type of vehicle diagnostic connector capable of interfacing with a vehicle bus 160 of the vehicle 106 to receive telemetry data from the components of the vehicle 106 as discussed below. For example, in the illustrative embodiment, the bus connector 154 is embodied as a vehicle diagnostic connector configured to mate with an OBD-II port of the vehicle 106. In other embodiments, however, the telematics device 104 may be directly connected or otherwise coupled to the vehicle bus 160 with a wiring harness or other connector/connections.

As shown, each telematics device 104 is coupled to or otherwise included in a corresponding vehicle 106. Each vehicle 106 may be embodied as, without limitation, a heavy truck, a fleet vehicle, a garbage truck, a snow plow, a dump truck, a bus, a light truck, a passenger car, an airplane, a water craft, or other vehicle. Additionally or alternatively, in some embodiments, the telematics device 104 may be coupled to another asset such as a shipping pallet, a tool cage, a restricted access room, a section of the warehouse, or any other device or location that may be monitored or tracked using a telematics device 104. Illustratively, the vehicle 106 is a vehicle, and the telematics device 104 is configured to monitor operating conditions or characteristics of the vehicle 106, including the acceleration of the vehicle 106, and to communicate telematics data indicative of the operating conditions of the vehicle 106 to the telematics server 102.

As discussed above, the illustrative vehicle 106 further includes the vehicle bus 160, which may be coupled to multiple connected devices such as controllers 162 and sensors 164 of the vehicle 106. The vehicle bus 160 may be embodied as a controller area network (CAN) bus, a local area network, a wireless network, or another communications network that allows various components of the vehicle 106 and/or peripheral devices to communicate. As discussed above, the telematics device 104 may be coupled to the vehicle bus 160 via the bus connector 154 or via other mechanisms (e.g., a direct connection).

Each of the controllers 162 may be embodied as an electronic control unit (ECU), an engine controller, a vehicle controller, a microcontroller, or other embedded computing resource of the vehicle 106. Each controller 162 may provide vehicle speed or velocity signals, odometer signals, engine telemetry, ignition signals, or other vehicle telemetry data over the vehicle bus 160. Each of the sensors 164 may be embodied as a speed sensor, a location sensor (e.g., a GPS receiver), a temperature sensor, an environmental sensor, a weight sensor, a vehicle- or application-specific sensor such as a snow plow position sensor, a fork lift position sensor, a tire pressure sensor, a door state sensor, or other sensor device configured to provide sensor data over the vehicle bus 132. Although illustrated in FIG. 1 as being coupled to the telematics device 104 via the vehicle bus 160, it should be understood that in some embodiments one or more of the controllers 162 and/or the sensors 164 may be coupled directly to the telematics device 104 via Bluetooth Low Energy (BLE), wireless networking (WiFi), a direct serial connection, or other connection.

In some embodiments, the vehicle 106 may also include a mobile communication device 112 coupled to the telematics device 104. The mobile communication device 112 may be embodied as a cellular modem, a smartphone, a cellular telephone, an IoT gateway, an IoT router, or other device that enables communications between the telematics device 104 and one or more remote devices such as the telematics server 102. Additionally or alternatively, in some embodiments the telematics device 104 may include integrated communication circuitry capable of network communication, such as the communication subsystem 150 described above.

The telematics system 100 may also include a fleet operation computer 110 in some embodiments. In such embodiments, the fleet operation computer 110 may be embodied as any type of computation or computer device capable of managing the fleet of vehicles 106 and performing the functions described herein, including, without limitation, a server, a rack-mounted server, a blade server, a workstation, a network appliance, a web appliance, a desktop computer, a laptop computer, a tablet computer, a smartphone, a consumer electronic device, a distributed computing system, and/or a multiprocessor system. Additionally, in some embodiments, the fleet operation computer 110 may be embodied as a "virtual server" formed from multiple computing devices distributed across the network 108 and operating in a public or private cloud. The fleet operation computer 110 includes components and devices commonly found in a computer or similar computing device, such as a processor, an I/O subsystem, a memory, a data storage device, and/or communication circuitry. Those individual components of the fleet operation computer 110 may be similar to the corresponding components of the telematics server 102, the description of which is applicable to the corresponding components of the fleet operation computer 110 and is not repeated herein so as not to obscure the present disclosure.

As discussed in more detail below, the telematics server 102, the telematics device 104, and the fleet operation computer are configured to communicate with each other and/or other devices of the telematics system 100 over the network 108. The network 108 may be embodied as any number of various wired and/or wireless networks. For example, the network 108 may be embodied as, or otherwise include, a wired or wireless local area network (LAN), a wired or wireless wide area network (WAN), a cellular network, an access point name (APN)/virtual private network (VPN) over public connections (e.g., cellular), and/or a publicly-accessible, global network such as the Internet. As such, the network 108 may include any number of additional devices, such as additional computers, routers, stations, and switches, to facilitate communications among the devices of the system 100.

Figure 2:
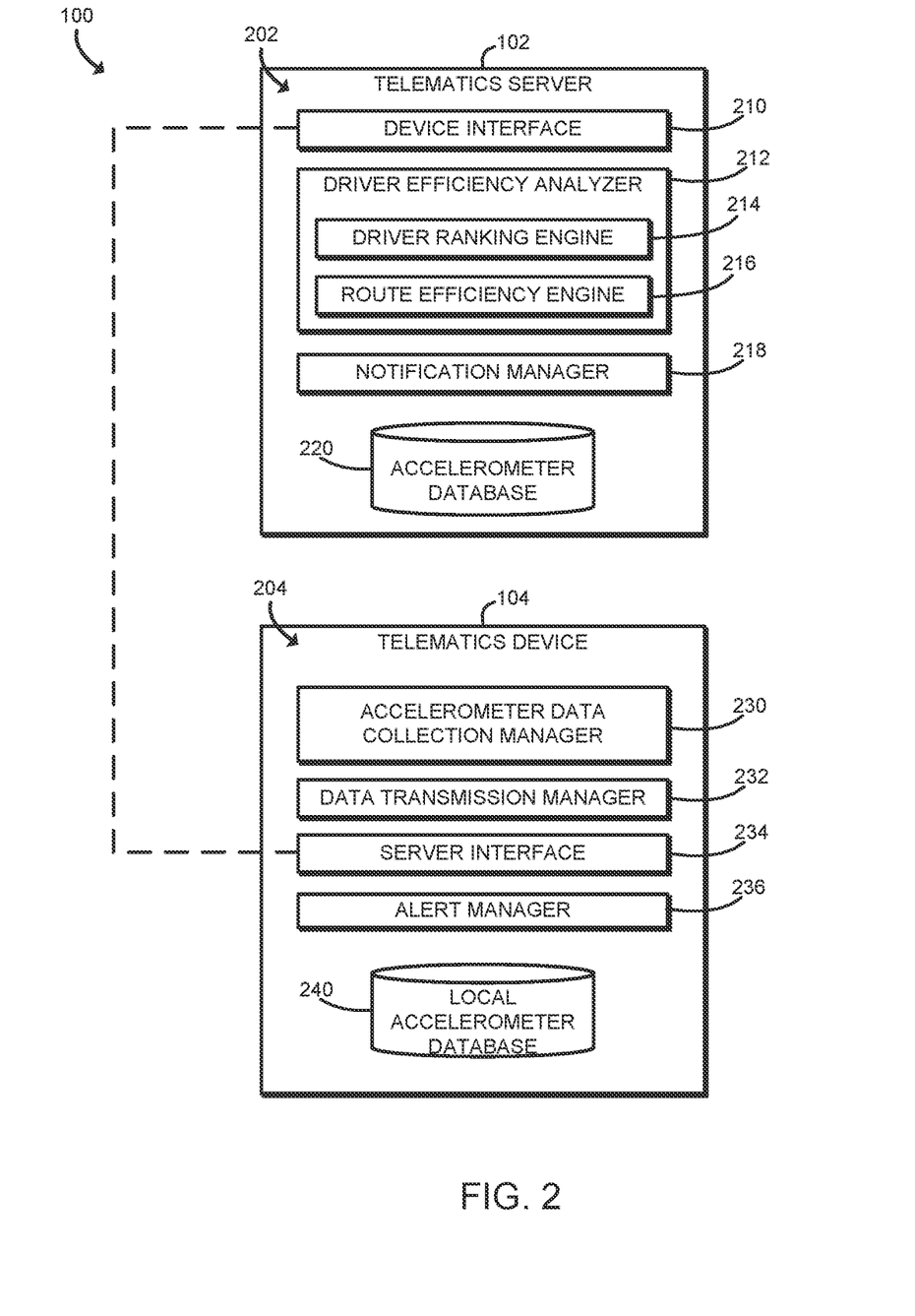
FIG. 2 is a simplified block diagram of various environments that may be established by the telematics system of FIG. 1.

Referring now to FIG. 2, in the illustrative embodiment, the telematics server 102 is configured to establish an environment 202 during operation. The illustrative environment 202 includes a device interface 210, a driver efficiency analyzer 212, a notification manager 218, and an accelerometer database 220. The various components of the environment 202 may be embodied as hardware, firmware, software, or a combination thereof. As such, in some embodiments, one or more of the components of the environment 202 may be embodied as circuitry or a collection of electrical devices (e.g., device interface circuitry 210, driver efficiency analyzer circuitry 212, and/or notification manager circuitry 218). It should be appreciated that, in such embodiments, one or more of those components may form a portion of the processor 122, the I/O subsystem 126, and/or other components of the telematics server 102.

The device interface 210 is configured to establish communications with the telematics device 104 and other devices of the system 100 (e.g., the fleet operation computer 110). In use, the device interface 210 receives accelerometer data from the telematics device 104 and stores the accelerometer data in the accelerometer database 220. The accelerometer data defines a pattern of acceleration of the vehicle over a time period as illustratively shown in FIGS. 6-9 and discussed further below. For example, the accelerometer data may define a series of positive and negative acceleration over a sixty second, one hour, or other reference time period. The device interface 210 is also configured to transmit, when appropriate, a notification to the telematics device 104 (and/or the fleet operation computer 110). For example, if the determined driver efficiency score is greater than a reference threshold (i.e., has an increased amount of acceleration/deceleration relative to the reference threshold), the device interface 210 may transmit the notification to the telematics device 104 to inform the driver of the vehicle 106.

The driver efficiency analyzer 212 is configured to analyze the received accelerometer data to determine a driver efficiency score for the driver for a particular time period (e.g., a trip measured from an "ignition start" event to an "ignition off" event). The determined driver efficiency score may be a general, global driver efficiency score for the driver (which may be updated periodically) or may be associated with a particular route or trip. As discussed above, the driver efficiency score is indicative of an average absolute acceleration of the vehicle 106 over the time period of the measured accelerometer data. For example, in the illustrative embodiment and as discussed in more detail below in regard to FIGS. 6-9, the driver efficiency analyzer 212 may initially determine absolute accelerometer data based on the accelerometer data to account for any deceleration in the acceleration pattern. The driver efficiency analyzer 212 may then determine a total acceleration value for the time period based on the absolute accelerometer data and determine an average absolute acceleration by dividing the total acceleration value by the length of the time period. Additionally, in some embodiments, the driver efficiency analyzer 212 may be configured to ignore periods of no movement of the vehicle 106 (e.g., when the vehicle 106 is at a stop).

In the illustrative embodiment, the driver efficiency score may be described as an amount of acceleration (e.g., measured in units of gravity "g") per second or other time slice. Accordingly, the higher the driver efficiency score, the greater amount of rapid acceleration and, as such, lower fuel economy. The driver efficiency analyzer 212 monitors the driver efficiency score of the driver by comparing the computed driver efficiency score to a reference threshold. If the determined driver efficiency score satisfies a relationship to the reference threshold (e.g., is at least equal to), the driver efficiency analyzer 212 may determine that the driver is not driving efficiently and may generate a notification to inform the driver (or a fleet manager).

The driver efficiency analyzer 212 also includes a driver ranking engine 214 and a route efficiency engine 216. The driver ranking engine 214 is configured to rank the driver with other drivers based on their corresponding driver efficiency score. Such ranking may be used to reward drivers exhibiting high efficiency, as well as assigning drivers to particular vehicles, routes, and/or work schedules. The route efficiency engine 216 is configured to determine an average driver efficiency score for a particular route based on determined efficiency scores from multiple drivers of that particular route. As such, different routes may be compared to each other to select the most fuel efficient route for the drivers.

The notification manager 218 is configured generate and transmit, via the device interface 210, a notification to the driver and/or fleet manager in response to a determination that the determined driver efficiency score does not satisfy the reference threshold. As discussed above, the notification may provide information regarding the determined driver efficiency score, request action from the driver or fleet manager, and/or control various aspects of the vehicle 106 (e.g., apply or engage a governor on the vehicle 106 to limit maximum speed and/or acceleration).

Still referring to FIG. 2, in the illustrative embodiment, the telematics device 104 establishes an environment 204 during operation. The illustrative environment 204 includes an accelerometer data collection manager 230, a data transmission manager 232, a server interface 234, an alert manager 236 and various data sets including a local accelerometer database 240. Similar to environment 202, the various components of the environment 204 may be embodied as hardware, firmware, software, or a combination thereof. As such, in some embodiments, one or more of the components of the environment 204 may be embodied as circuitry or a collection of electrical devices (e.g., data collection manager circuitry 230, data transmission manager circuitry 232, server interface circuitry 234, and alert manager circuitry 236). It should be appreciated that, in such embodiments, one or more of those components may form a portion of the processor 142, the I/O subsystem 146, and/or other components of the telematics device 104.

The accelerometer data collection manager 230 is configured to collect or receive accelerometer data from the accelerometer device 152 and store the received accelerometer data in the local accelerometer database 240. In some embodiments, the collected accelerometer data may include data received from sensors 164 of controllers 162 of the vehicle 106 as well. For example, in some embodiments, the accelerometer data collection manager 230 may be configured to receive speed data from a vehicle speed sensor 164, from which the acceleration of the vehicle 106 may be determined.

The data transmission manager 232 is configured to manage the transmission of the accelerometer data from the telematics device 104 to the telematics server 102. To do so, the data transmission manager 232 may use any suitable transmission schedule to transfer the accelerometer data to the telematics server 102. For example, in some embodiments, the data transmission manager 232 may transmit the accelerometer data as it is received from the accelerometer device 152 or other sensors of the vehicle 106. In other embodiments, the data transmission manager 232 may be configured to "batch" the accelerometer data and periodically transmit the data to the telematics server 102. For example, in some embodiments, the data transmission manager 232 may transmit the accelerometer data based on identification of an end event indicative of the completion of a trip (e.g., an "ignition off" event).

The server interface 234 is configured to establish communications with the telematics server 102. In use, the server interface 234 transmits the telematics data when instructed to do so by the data transmission manager 232. Additionally, server interface 234 receives any notifications transmitted by the telematics server 102 (as well as any other data), based on the transmitted telematics data.

The alert manager 236 is configured to manage notifications received from the telematics server 102. In embodiments in which the notification includes instructions, the alert manager 236 is configured to execute the instructions of the received notification. For example, the alert manager 236 may activate an alert device of the telematics device 104 and/or vehicle 106 based on the notification. Additionally or alternatively, in embodiments in which the notification includes information to be provided to the driver, the alert manager 236 is configured to present the information to the driver (e.g., via a display screen or speaker).

Figure 3:
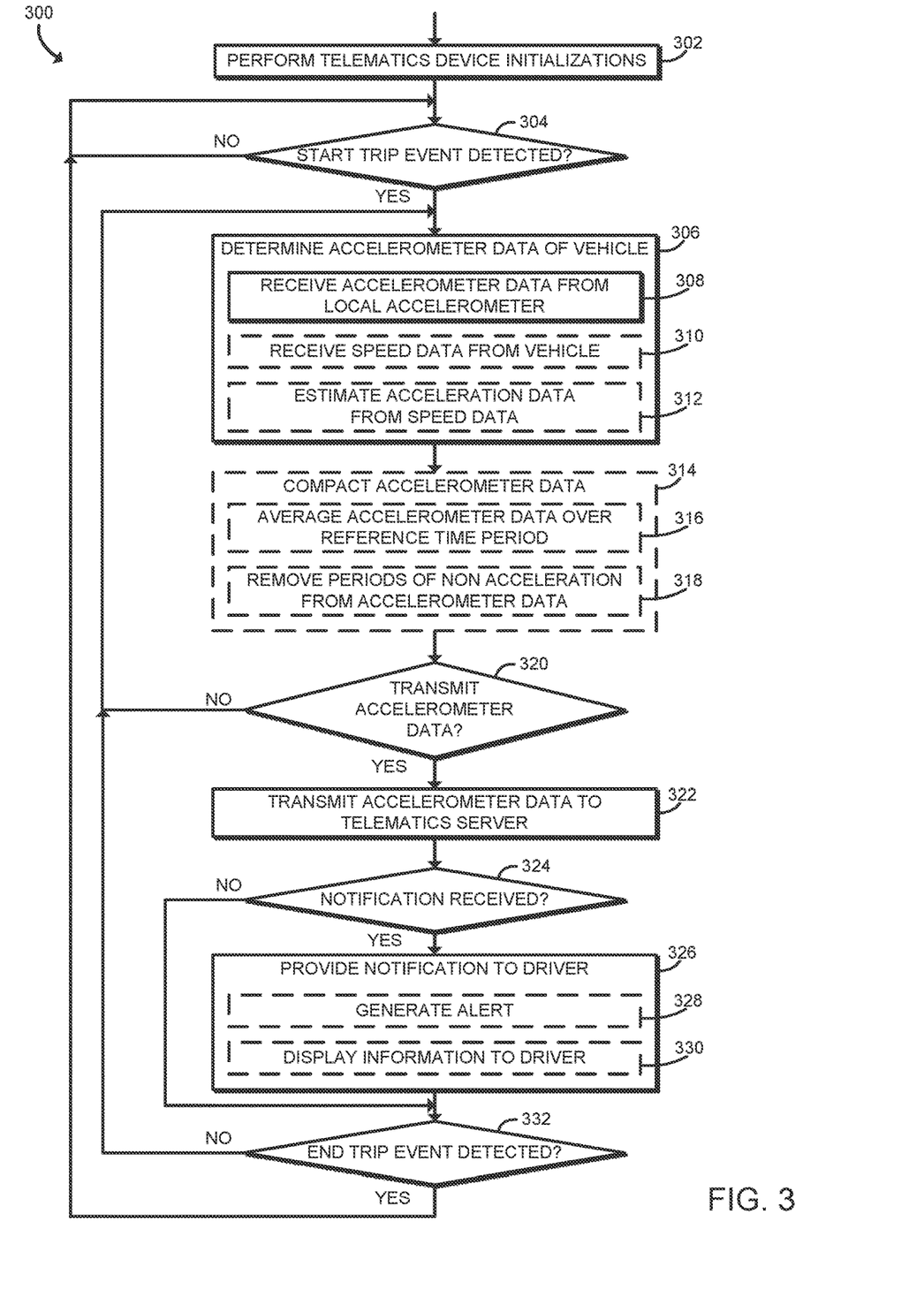
FIG. 3 is a simplified flow diagram of at least one embodiment of a method for managing accelerometer data related to a vehicle that may be executed by a vehicle telematics device of the telematics system of FIGS. 1 and 2.

Referring now to FIG. 3, in use, the telematics device 104 may execute a method 300 for managing accelerometer data related to the vehicle 106. It should be appreciated that, in some embodiments, the operations of the method 300 may be performed by one or more components of the environment 204 of the telematics device 104 as shown in FIG. 2.

The method 300 begins with block 302, in which the telematics device 104 may perform various initializations procedures. For example, the telematics device 104 may load an operating system and/or various software or software extensions in block 302 as part of a power-up cycle. Subsequently, in block 304, the telematics device 104 determines whether a "start trip" even has been detected. For example, the telematics device 104 may determine that a "start trip" event has occurred in response to detection of the ignition of the vehicle being turned on, initial movement of the vehicle, or other factor. In some embodiments, the driver of the vehicle 106 may be able to indicate to the telematics device 104 that the trip has started (e.g., via selection of an associated input device or icon).

If the telematics device 104 has detected a "start trip" event, the method 300 advances to block 306 in which the telematics device determines accelerometer data of the vehicle 106. To do so, in the illustrative embodiment in block 308, the telematics device 104 receives the accelerometer data form the accelerometer device 152 or other accelerometer of the vehicle 106. However, in other embodiments, the telematics device 104 may be configured to infer or calculate the accelerometer data based on speed data of the vehicle. In such embodiments, the telematics device 104 may receive speed data indicative of the speed of the vehicle from a corresponding speed sensor 164 or controller 162 of the vehicle 106 in block 310. If so, the telematics device 104 may estimate the acceleration data based on the received speed data in block 312.

After the telematics device 104 has received the accelerometer data in block 306, the method advances to block 314 in some embodiment. In block 314, the telematics device 104 may compact the accelerometer data to prepare the data for transmission. For example, in some embodiments in block 316, the telematics device 104 may average the accelerometer data over a reference time period. For example, if the monitored trip is excessively long, the telematics device 104 may increase the granularity of the reported accelerometer data by averaging time windows of the accelerometer data. Additionally or alternatively, the telematics device 104 may remove periods of no acceleration (i.e., period of no positive or negative acceleration) from the accelerometer data in block 318. In doing so, the telematics device 104 may add time stamps to the data to temporally register the identified periods of acceleration.

In block 320, the telematics device 104 determines whether to transmit the acquired accelerometer data to the telematics server 102. As discussed above, the telematics device 104 may be configured to transmit the accelerometer data as it is received, may batch the accelerometer data and transmit the data periodically, or may transmit the accelerometer data upon detection of a "end trip" event (e.g., detection of the ignition of the vehicle being turned off, the vehicle 106 not moving for a period of time, etc.).

If the telematics device 104 determines not to transmit the accelerometer data at the present time, the method 300 loops back to block 306 in which the telematics device 104 continues to determine the accelerometer data of the vehicle 106. If, however, the telematics device 104 determines to transmit the accelerometer data in block 320, the method 300 advances to block 322 in which the telematics device 104 transmits the accelerometer data to the telematics server 102.

Subsequently, in block 324, the telematics device 104 determines whether a notification has been received from the telematics server 102. If so, in block 326, the telematics device 104 provides the notification to the driver of the vehicle 106. For example, in block 328, the telematics device 104 may generate an audible, visual, or tactile alert to notify the driver. Additionally or alternatively, in block 330, the telematics device 104 may display information included in the notification to the driver.

If no notification has been received from the telematics server in block 324 or after the notification has been provided to the driver in block 326, the method 300 advances to block 332. In block 332, the telematics device determines whether an "end trip" event has been detected. For example, as discussed above, the telematics device 104 may determine that the present trip has ended by detecting that the ignition of the vehicle 106 has been turned off, if the vehicle 106 has not moved for a period of time, based on an input from the driver of the vehicle 106, or other criteria. If an "end trip" event has not been detected, the method 300 loops back to block 306 in which the telematics device 104 continues to determine the accelerometer data of the vehicle 106. If, however, an "end trip" event has been detected, the method 300 loops back to block 304 in which the telematics device 104 monitors for a "start trip" event indicating the start of the next trip.

Figure 4A:
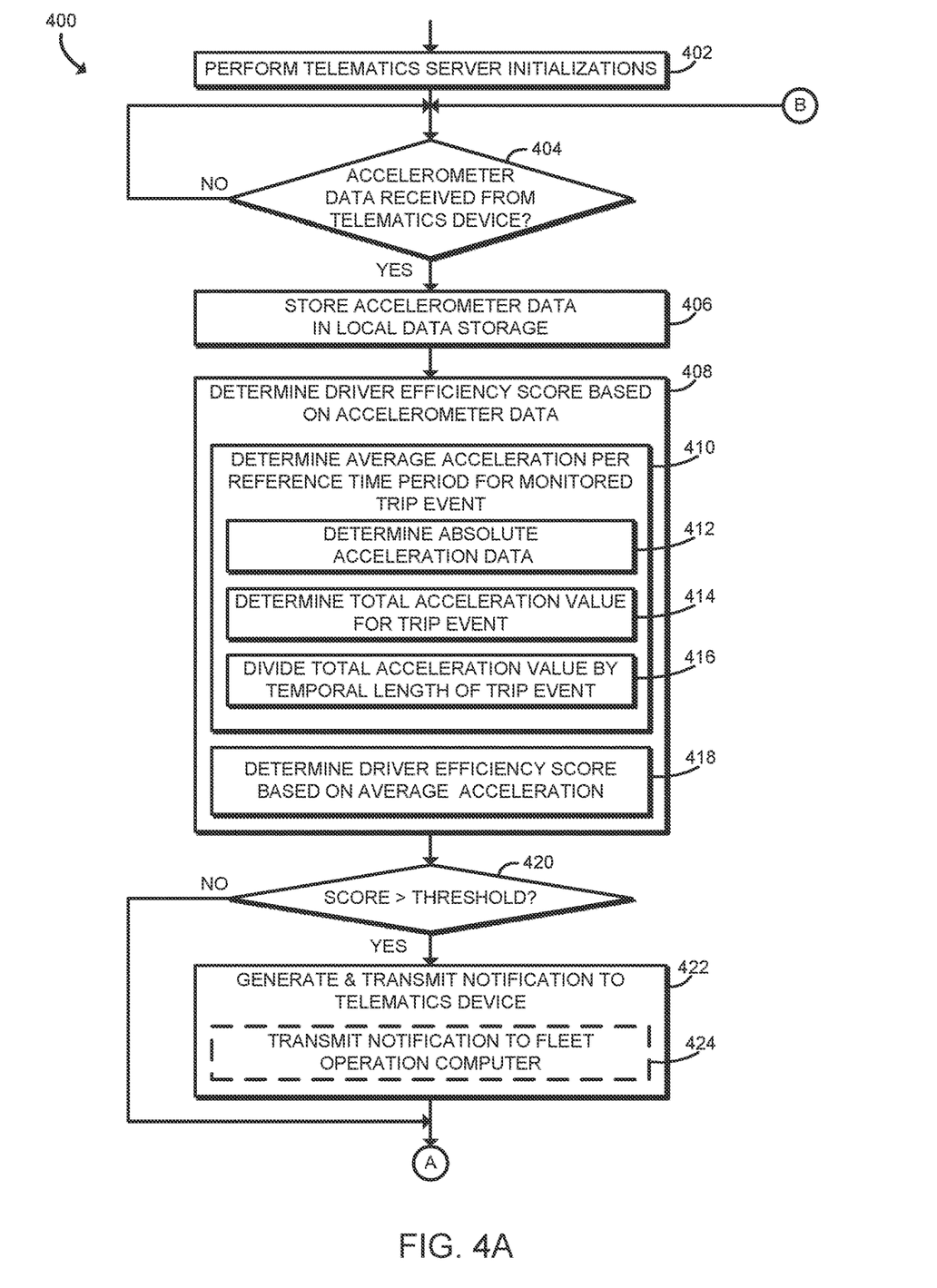
FIGS. 4A & 4B is a simplified flow diagram of at least one embodiment of a method for determining driver efficiency that may be executed by a telematics server of the telematics system of FIGS. 1 and 2.
Figure 4B:
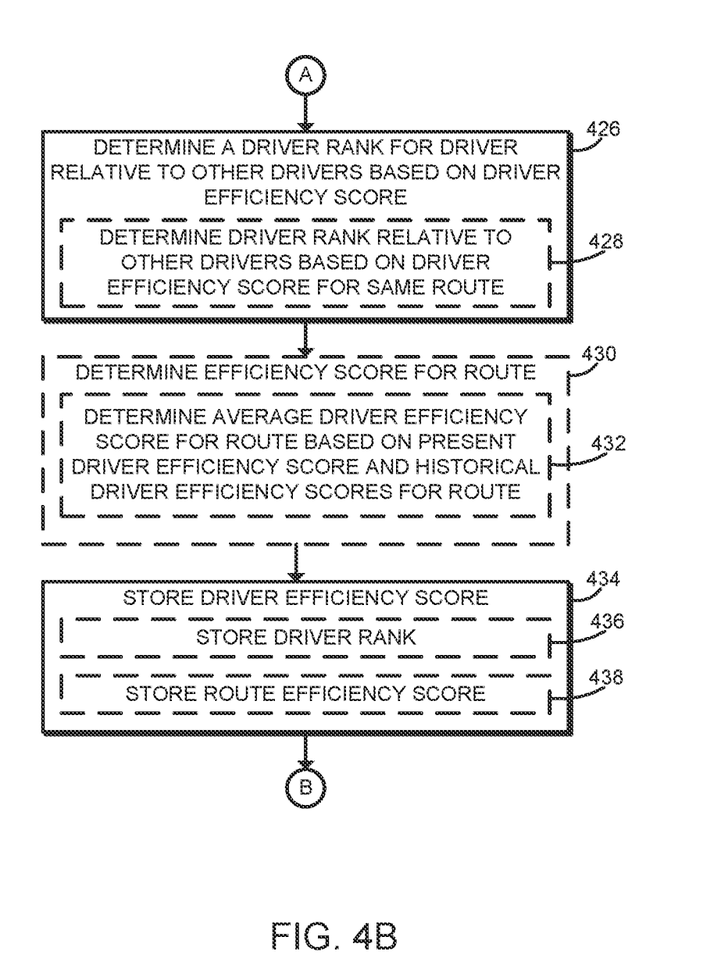

Referring now to FIGS. 4A and 4B, in use, the telematics server 102 may execute a method 400 a method for determining driver efficiency. It should be appreciated that, in some embodiments, the operations of the method 400 may be performed by one or more components of the environment 202 of the telematics server 102 as shown in FIG. 2.

The method 400 begins with block 402, in which the telematics server 102 may perform various initializations procedures. For example, the telematics server 102 may load an operating system and/or various software or software extensions in block 402 as part of a power-up cycle. Subsequently, in block 404, the telematics server 102 monitors for accelerometer data from the telematics device 104. If accelerometer data is received in block 404, the method 400 advances to block 406 in which the telematics server 102 stores the received telematics data in the accelerometer database 220.

Subsequently, in block 408, the telematics server 102 determines a driver efficiency score based on the received accelerometer data over a defined time period (e.g., for a full trip as indicated by a "start trip" event and "end trip" event). To do so, in block 410, the telematics device 104 determines an average acceleration per reference time period for the trip event (i.e., for the reported time period associated with the accelerometer data). For example, in the illustrative embodiment, the telematics server 102 determines the average acceleration per second for the trip event. To do so, in block 412, the telematics device 104 determines an absolute acceleration data based on the received accelerometer data, which accounts negative acceleration (i.e., deceleration) the acceleration pattern. In block 414, the telematics device 104 then determines a total acceleration value for the time period based on the absolute accelerometer data by summing up each absolute acceleration period of the acceleration pattern. Next, in block 416, the telematics device 114 divides the total acceleration value by the temporal length of the acceleration pattern, which is indicative of the trip event.

Figure 6:
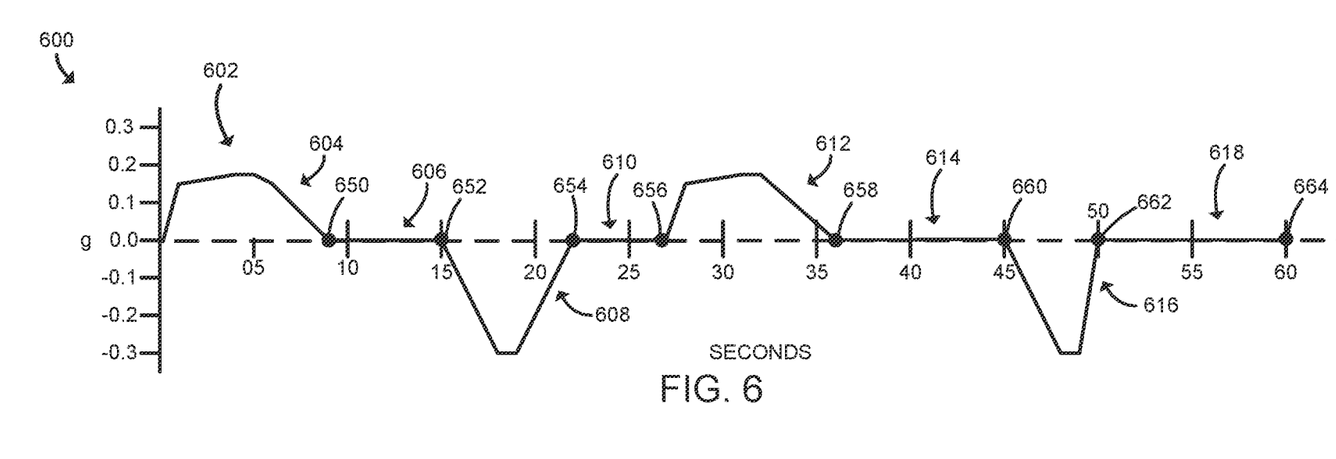
FIG. 6 is a simplified graph of accelerometer data of a vehicle driven by a driver during a trip.

For example, a graph 600 is shown in FIG. 6 and includes an acceleration pattern 602 of accelerometer data of a first driver for a sixty second trip. The acceleration pattern 602 includes an initial period 604 of rapid acceleration to about 24 miles per hour at time point 650 (~9 seconds), at which the driver has traveled a total of about 0.03 miles. The initial period 604 is followed by a period 606 of relatively zero acceleration, with the driver maintaining the 24 miles per hour speed until time point 652 (~15 seconds), at which the driver has traveled a total of about 0.07 miles. The period 606 is followed by a period 608 of rapid negative acceleration (i.e., deceleration) to about 0 miles per hour at time point 654 with the driver having traveled about 0.09 miles in total. The period 608 is followed by a period 610 of zero acceleration with the driver having come to a stop until time point 656 (~27 seconds), at which time the driver rapidly accelerates during period 612 to about 24 miles per hour at time point 658 (~36 seconds) and having traveled a total of about 0.12 miles. The period 612 is followed by a period 614 of relatively zero acceleration, with the driver maintaining the 24 miles per hour speed until time point 660 (~45 seconds), at which the driver has traveled a total of about 0.16 miles. The period 614 is followed by a period 616 of rapid negative acceleration (i.e., deceleration) to about 8 miles per hour at time point 662 with the driver having traveled about 0.18 miles in total. The period 616 is followed by a period 618 of relatively zero acceleration, with the driver maintaining the 8 miles per hour speed until time point 664 (~60 seconds), at which the driver has completed the trip.

Figure 7:
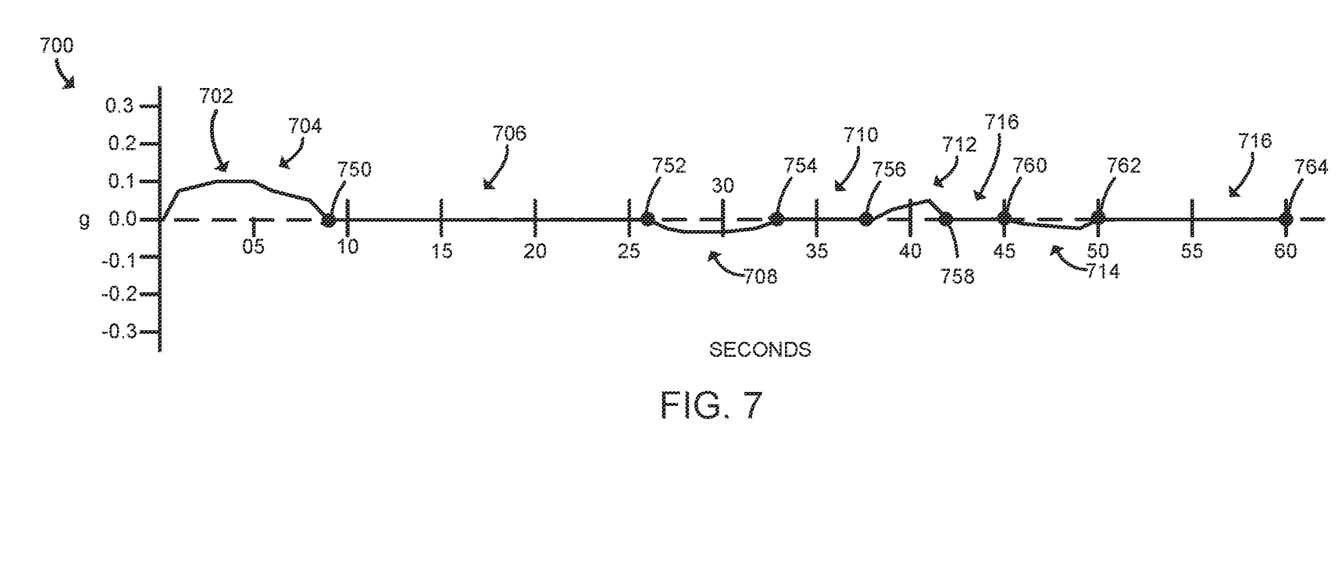
FIG. 7 is a simplified graph of accelerometer data of a vehicle driven by another driver during a trip.

Another example of a similar trip by a second driver is shown in graph 700 of FIG. 7, which includes an acceleration pattern 702 of accelerometer data for the sixty second trip. The acceleration pattern 702 includes an initial period 704 of mild acceleration to about 13 miles per hour at time point 750 (~9 seconds), at which the driver has traveled a total of about 0.02 miles. The initial period 704 is followed by a period 706 of relatively zero acceleration, with the driver maintaining the 13 miles per hour speed until time point 752 (~26 seconds), at which the driver has traveled a total of about 0.09 miles. The period 706 is followed by a period 708 of very mild negative acceleration (i.e., deceleration) to about 11 miles per hour at time point 754 (~33 seconds) with the driver having traveled about 0.11 miles in total. The period 708 is followed by a period 710 of relatively zero acceleration, with the driver maintaining the 11 miles per hour speed until time point 756 (~38 seconds), at which point the driver mildly accelerates during period 712 to about 13 miles per hour at time point 758 (~42 seconds). The period 712 is followed by another period 716 of relatively zero acceleration, with the driver maintaining the 13 miles per hour speed until time point 760 (~45 seconds), at which point the driver very mildly decelerates (i.e., negative acceleration) during period 714 to about 22 miles per hour at time point 762 (~50 seconds). The period 714 is followed by a period 716 of relatively zero acceleration, with the driver maintaining the 11 miles per hour speed until time point 764 (~60 seconds), at which the driver has completed the trip.

Figure 8:
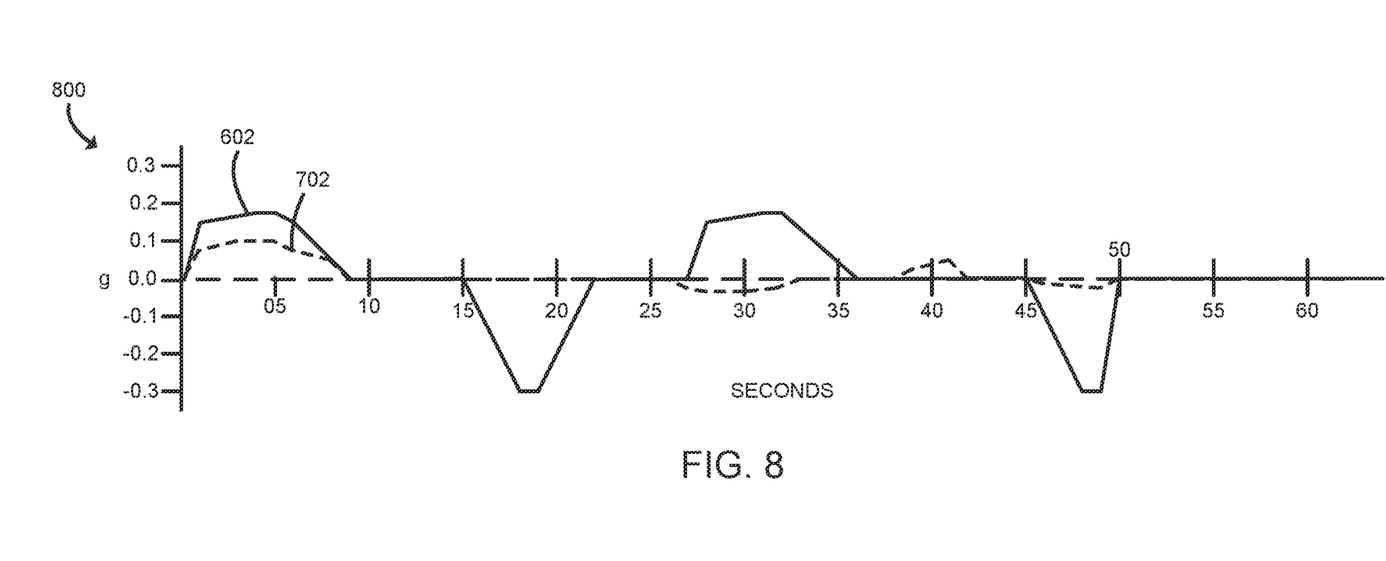
FIG. 8 is a simplified graph of accelerometer data of FIGS. 6 and 7 superimposed on the same graph.
Figure 9:
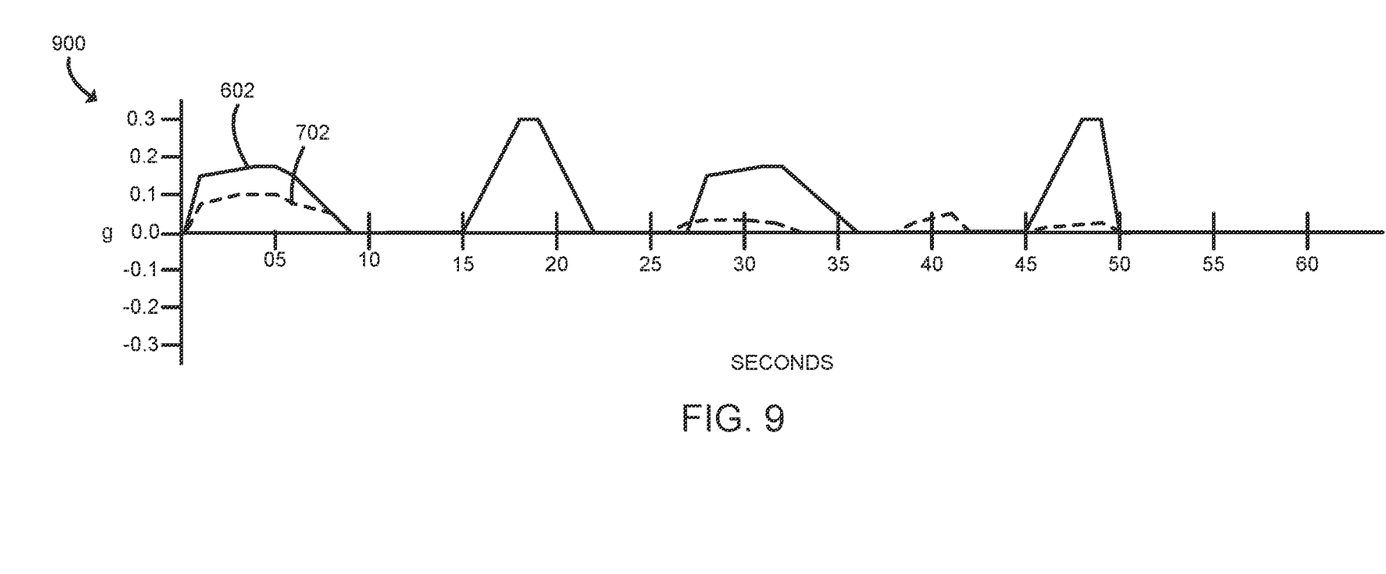
FIG. 9 is a simplified graph of absolute accelerometer data of the accelerometer data shown in FIG. 10.

The acceleration pattern 602 of the first driver and the acceleration patter 702 of the second driver are shown together in graph 800 of FIG. 8. As is readily apparent, the acceleration pattern 602 of the first driver has much greater positive and negative accelerations than the acceleration pattern 702 of the second driver, and the total acceleration of the acceleration pattern 602 (i.e., the area under the curve of acceleration pattern 602) is greater than the acceleration pattern 702 as evident by graph 800. However, to compare the two acceleration patterns 602, 702, the telematics server 102 is configured to determine an average acceleration per second (or per reference time period), which allows acceleration patterns of different time lengths to be compared. To do so, as discussed above, the telematics server first determines a total absolute acceleration for the acceleration pattern. As shown in FIG. 9, the absolute acceleration of the acceleration patterns 602, 702 may be visualized by inverting those time periods of negative acceleration. The telematics server 102 then determines the total acceleration value for each acceleration pattern 602, 702 by summing up the areas under each respective curve. The final average acceleration is then determined by the telematics server 102 by dividing the total acceleration value by the total time of the trip (i.e. 60 seconds for the illustrative acceleration patterns 602, 702). In the illustrative embodiment of FIG. 9, this produces an average acceleration per second of 0.073 g for the first driver of acceleration pattern 602 and an average acceleration per second of 0.014 g for the second driver of acceleration pattern 702. As such, the second driver has a lower amount of average acceleration and, presumably, and increased fuel efficiency over the first driver. Such determination may be used by the telematics server 102 to reward the second driver, correct the driving behavior of the first driver, and/or assign the first driver and second driver to particular vehicles and/or routes.

Referring now back to FIG. 4A, after the telematics server 102 determines the average acceleration for the reference time period, the telematics server 102 determines the driver efficiency score based on the determined average acceleration. In some embodiments, the driver efficiency score may be equal to the determined average acceleration (e.g., equal to 0.073 g for the first driver of the acceleration pattern 602). Alternatively, in other embodiments, the driver efficiency score may be a value determined based on the average acceleration (e.g., a rounded or quantized value). For example, in some embodiments, the driver efficiency score may be a moving average of a predetermined number of computed driver efficiency scores for that particular driver.

Regardless, after the driver efficiency score has been determined in block 418, the method 400 advances to block 420 in which the telematics server 102 determines whether the driver efficiency score satisfies a reference threshold score (e.g., is greater than or is equal to or greater than). If not, the method 400 advances to block 422 in which the telematics server 102 generates and transmits a notification to the telematics device 104. As discussed above, the notification may provide an alert and/or information to the driver regarding the determined driver efficiency score. Additionally, in some embodiments, the telematics server 102 may transmit the notification to the fleet operation computer 110 to inform a fleet manager of the driver's efficiency score in block 424.

After the telematics server 102 has transmitted the notification or if no notification is required, the method 400 advances to block 426 of FIG. 4B. In block 426, the telematics server 102 determines a driver rank for the driver relative to other drivers based on the determine driver efficiency score for that driver. Additionally or alternatively, in block 428, the driver rank may be determined for a particular route, rather than (or in addition to) a global ranking.

In some embodiments, in block 430, the telematics server 102 may also determine an efficiency score for a particular route. That is, the determined driver efficiency score may be used in the calculation of a "global" efficiency score for the particular route or driven path. For example, in block 432, the telematics server 102 may determine an average driver efficiency score for the route based on the newly determined driver efficiency score and historical or previously-determined driver efficiency scores for that route.

Subsequently, in block 434, the telematics server 102 may store the driver efficiency score in the data storage 128. Additionally or alternatively, the telematics server 102 may store the driver rank determined in block 426 and/or the route efficiency score determined in block 430 in the data storage 128 in blocks 436, 438, respectively. In this way, the telematics server 102 may maintain driver efficiency scores and/or ranks, which may be updated over time.

Figure 5:
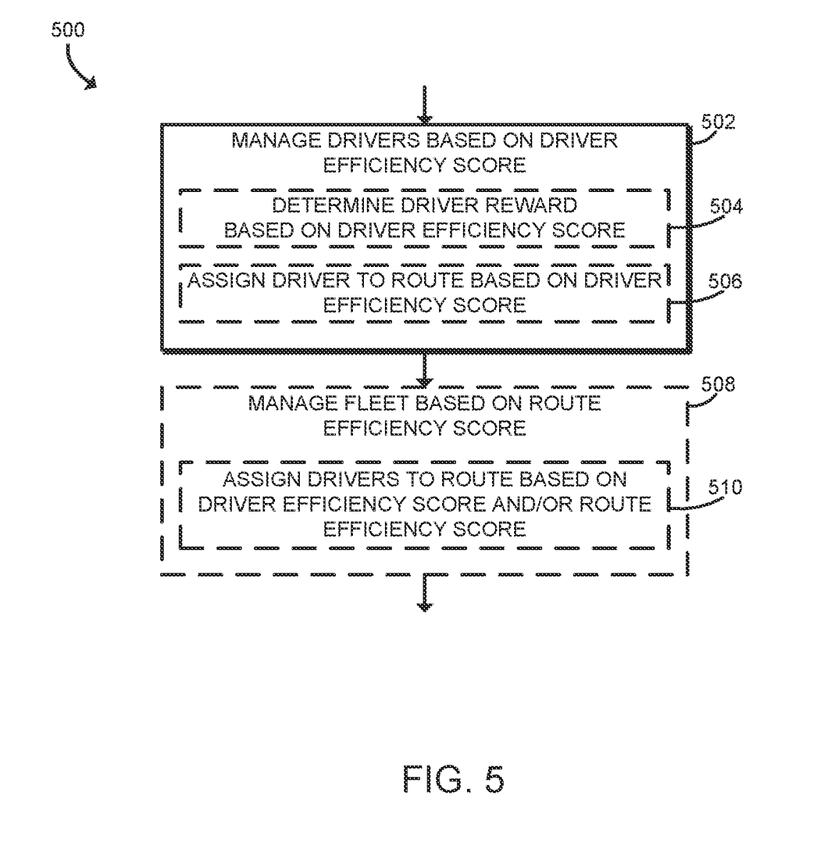
FIG. 5 is a simplified flow diagram of at least one embodiment of a method for managing a vehicle fleet based on driver and/or route efficiency that may be executed by a fleet operation computer or the telematics server of the telematics system of FIGS. 1 and 2.

Referring now to FIG. 5, the fleet operation computer 110 and/or the telematics server 102 may execute a method 500 for managing a vehicle fleet based on driver and/or route efficiency. The method 500 begins with block 502, in which the fleet operation computer 110/telematics server 102 manages driver based on the present driver efficiency score associated with each particular driver. For example, in block 504, the fleet operation computer 110/telematics server 102 may determine a driver reward for each driver based on their associated driver efficiency score. Additionally, in block 506, the fleet operation computer 110/telematics server 102 may assign the driver to a particular route based on the driver's efficiency score. For example, drivers with better driver's efficiency scores (e.g., lower average accelerations) may be assigned to more challenging routes.

Additionally, in some embodiments in block 508, the fleet operation computer 110/telematics server 102 may manage the fleet of vehicles and drivers based on determined route efficiency scores. For example, in block 510, the fleet operation computer 110/telematics server 102 may assign particular drivers to particular routes based on the driver's efficiency score and/or the route efficiency score so as to improve the overall fuel efficiency of the fleet.

The invention claimed is:

1. A telematics server for determining driver efficiency, the telematics server comprising:
    a device interface configured to receive accelerometer data from a telematics device located in a vehicle driven by a driver, wherein the accelerometer data defines a pattern of acceleration of the vehicle over a time period; and
    a driver efficiency analyzer configured to (i) determine a driver efficiency score of the driver based on the accelerometer data, wherein the driver efficiency score is indicative of an average absolute acceleration of the vehicle over the time period, (ii) compare the driver efficiency score to a reference efficiency score, and (iii) generate a notification in response to a determination that the driver efficiency score satisfies a relationship to the reference efficiency score,
    wherein the device interface is further configured to transmit the notification.

2. The telematics server of claim 1, wherein to determine the driver efficiency score comprises to determine absolute accelerometer data based on the accelerometer data, determine a total acceleration value for the time period based on the absolute accelerometer data, and determine an average absolute acceleration by dividing the total acceleration value by a temporal length of the time period.

3. The telematics server of claim 2, wherein to determine the average absolute acceleration of the vehicle over the time period comprises to ignore periods of the accelerometer data having no acceleration.

4. The telematics server of claim 1, wherein to transmit the notification comprises to transmit the notification to the telematics device, wherein the notification instructs the telematics device to generate an alert.

5. The telematics server of claim 1, wherein the driver efficiency analyzer is further configured to determine a driver rank for the driver based on the driver efficiency score determined for the driver and driver efficiency scores determined for other drivers.

6. The telematics server of claim 1, wherein the device interface is further configured to receive route information defining a route taken by the vehicle during the generation of the accelerometer data, and
wherein to determine the driver efficiency score comprises to determine a driver efficiency score of the driver for the route.

7. The telematics server of claim 1, wherein the driver efficiency analyzer is further configured to determine a reward for the driver based on the driver efficiency score determined for the driver.

8. The telematics server of claim 1, wherein the driver efficiency analyzer is further configured to assign the driver to another vehicle based on the driver efficiency score determined for the driver.

9. The telematics server of claim 1, wherein the device interface is further configured to receive route information defining a route taken by the vehicle during the generation of the accelerometer data, and
wherein the driver efficiency analyzer is further configured to determine an average driver efficiency score for the route based on the driver efficiency score determined for the driver and driver efficiency scores determined for other drivers for the route.

10. The telematics server of claim 9, wherein the driver efficiency analyzer is further configured to assign the driver to a first route based on the driver efficiency score determined for the driver and the average driver efficiency score of the first route.

11. A method for determining driver efficiency, the method comprising
receiving, by a telematics server, accelerometer data from a telematics device located in a vehicle driven by a driver, wherein the accelerometer data defines a pattern of acceleration of the vehicle over a time period;
determining, by the telematics server, a driver efficiency score of the driver based on the accelerometer data, wherein the driver efficiency score is indicative of an average absolute acceleration of the vehicle over the time period;
comparing the driver efficiency score to a reference efficiency score;
generating a notification in response to a determination that the driver efficiency score satisfies a relationship to the reference efficiency score; and
transmitting the notification.

12. The method of claim 11, wherein determining the driver efficiency score comprises determining absolute accelerometer data based on the accelerometer data, determining a total acceleration value for the time period based on the absolute accelerometer data, and determining an average absolute acceleration by dividing the total acceleration value by a temporal length of the time period.

13. The method of claim 11, further comprising determining, by the telematics server, a driver rank for the driver based on the driver efficiency score determined for the driver and driver efficiency scores determined for other drivers.

14. The method of claim 1, further comprising receiving, by the telematics server, route information defining a route taken by the vehicle during the generation of the accelerometer data, and
wherein determining the driver efficiency score comprises determining a driver efficiency score of the driver for the route.

15. The method of claim 11, further comprising assigning, by the telematics server, the driver to another vehicle based on the driver efficiency score determined for the driver.

16. The method of claim 11, further comprising:
receiving, by the telematics server, route information defining a route taken by the vehicle during the generation of the accelerometer data, and
determining, by the telematics server, an average driver efficiency score for the route based on the driver efficiency score determined for the driver and driver efficiency scores determined for other drivers for the route.

17. The method of claim 16, further comprising assigning, by the telematics server, the driver to a first route based on the driver efficiency score determined for the driver and the average driver efficiency score of the first route.

18. One or more non-transitory, computer-readable storage media comprising a plurality of instructions that, in response to execution, cause a telematics server to:
receive accelerometer data from a telematics device located in a vehicle driven by a driver, wherein the accelerometer data defines a pattern of acceleration of the vehicle over a time period;
determine a driver efficiency score of the driver based on the accelerometer data, wherein the driver efficiency score is indicative of an average absolute acceleration of the vehicle over the time period;
compare the driver efficiency score to a reference efficiency score;
generate a notification in response to a determination that the driver efficiency score satisfies the relationship to a reference efficiency score; and
transmit the notification.

19. The one or more non-transitory, computer-readable storage media of claim 18, wherein the plurality of instructions, in response to execution, further cause the telematics server to determine a driver rank for the driver based on the driver efficiency score determined for the driver and driver efficiency scores determined for other drivers.

20. The one or more non-transitory, computer-readable storage media of claim 18, wherein the plurality of instructions, in response to execution, further cause the telematics server to receive route information defining a route taken by the vehicle during the generation of the accelerometer data, and
wherein to determine the driver efficiency score comprises to determine a driver efficiency score of the driver for the route.

* * * * *